United States Patent Office 3,090,777
Patented May 21, 1963

3,090,777
REMOVAL OF CATALYST FROM OLEFIN POLYMERIZATION PRODUCTS
Donald H. Antonsen, Glen Mills, and Alfred Hahn, Jr., Lansdowne, Pa., assignors to Sun Oil Company, Philadelphia, Pa., a corporation of New Jersey
No Drawing. Filed May 3, 1961, Ser. No. 107,306
7 Claims. (Cl. 260—93.7)

This invention relates to the polymerization of alpha olefins to liquid polymers and more specifically is directed to an improved method for removing the catalyst residue from the polymerization product.

It is known that alpha olefins can be polymerized in a hydrocarbon reaction medium by means of a catalyst system comprising the combination of (1) a titanium halide, a vanadium halide or a vanadium oxyhalide with (2) an aluminum alkyl compound such as trialkyl aluminum, dialkyl aluminum monohalide, alkyl aluminum dihalide or aluminum sesquihalide. Under some conditions solid polymers are formed while under other conditions mainly liquid polymerization products can be obtained. After the reaction has been completed, it is necessary to destroy the catalyst and remove the catalyst residue from the polymerization product. The conventional procedure for doing this involves adding alcohol to the reaction mixture to cause reaction with the catalyst components and then water washing the catalyst residues from the hydrocarbon product. In following this procedure a difficulty arises due to the fact that acidic product, such as HCl, is formed by the reaction with the catalyst material, so that the operation has to be carried out in special equipment constructed from expensive non-corrosive material such as stainless steel. Furthermore several washings with water generally are required to insure the removal of all the catalyst residues, and for the operation to be practical a distillation step is required in order to recover the excess alcohol from the wash water.

The present invention is directed to an improved method for removing the catalyst residues, which method is applicable to polymerization systems that yield polymers which are at least mainly soluble in the hydrocarbon reaction medium. The invention is particularly useful for working up reaction mixtures in which the polymerization product comprises oils of the lubricating oil range.

According to the invention an olefinic hydrocarbon or mixture of olefins is polymerized in a hydrocarbon reaction medium by means of a catalyst system that comprises the combination of (1) a metal halide which is a titanium halide, a vanadium halide or a vanadium oxyhalide and (2) an aluminum alkyl which is trialkyl aluminum, dialkyl aluminum monohalide, alkyl aluminum dihalide or aluminum sesquihalide. The reaction conditions are such that the polymerization product remains soluble in the hydrocarbon reaction medium. After completion of the polymerization there is then dispersed in the reaction mixture a finely divided solid which is a carbonate, a bicarbonate, a hydroxide or an oxide of an alkali metal or an alkaline earth metal. The amount of such agent added is sufficient on a weight basis to be in excess of the amount of the metal halide used in preparing the catalyst. A limited amount of water sufficient to destroy the catalyst is then admixed with the dispersion. Preferably the amount of water added is in the range of 75–150% by weight based on the amount of finely divided solid used. The water reacts with the catalyst components and the resulting acidic material is immediately neutralized by the finely divided solid. This procedure also results in the accumulation of all other catalyst residue products by the finely divided solid, and the latter also soaks up any excess water. There are thus formed dark-colored solid granules or coarse powder containing all of the catalyst residues and unreacted water. This material can easily be separated from the hydrocarbon solution by filtration or decantation and a dry hydrocarbon product thereby is obtained. No special corrosion-resistant equipment is needed for carrying out this work-up procedure.

The finely divided solid agent used can be any of the alkali metal or alkaline earth metal carbonates, bicarbonates, oxides or hydroxides. Examples are sodium carbonate, potassium bicarbonate, calcium oxide, calcium carbonate, barium hydroxide, magnesium oxide and the like. Carbonates and oxides generally are the preferred agent. Ground limestone is a particularly inexpensive agent that can be employed in practicing the invention. The temperature at which the work-up treatment is done is not important and ambient temperature can be used.

Best results are obtained in practicing the invention when the amount of water employed is in the range of 75–150% by weight based on the finely divided solid used. When smaller amounts of water are used, e.g. 20–60%, the solid material tends to agglomerate into a single chunk or as relatively large size pellets and it is not as easily handled as the coarse black powder which is obtained when the amount of water is in the preferred range. When the amount of water is above 150%, two liquid phases generally are obtained and the mixture does not filter properly. Also the use of too much water tends to cause catalyst residues to be left in the hydrocarbon phase.

The following examples specifically illustrate the invention:

*Example I*

A catalyst solution is prepared by admixing 4.1 g. of aluminum sesquichloride and 5 g. of $TiCl_4$ in 190 g. of n-heptane under an atmosphere of nitrogen. The materials form both soluble and insoluble catalyst components. The catalyst mixture is contacted with 250 g. of pentene-1 at a temperature of 55° C. for 5 hours, after which the reaction mixture is discharged from the reactor under nitrogen pressure into a slurry of 20 g. of $Na_2CO_3$ in 200 ml. of n-hexane and the mixture is agitated for 5 minutes. 16 ml. of water are then added and the slurry is agitated for 5 more minutes. This causes the formation of a black granular solid which contains all of the catalyst residues and excess water. The mixture is filtered to obtain a water-white dry-looking solution of hexane, unreacted monomer and liquid polymers. By distillation a polypentene product boiling in the lubricating oil range is obtained in amount of about 165 g. This product has a viscosity index of about 90 and a pour point of about −50° F. The n-hexane solvent and the unreacted pentene-1 can be recovered, dried by means of a suitable dessicant such as molecular sieves and then reused.

*Example II*

The foregoing procedure is repeated except that 20 g. of calcium oxide are substituted for the sodium carbonate. Substantially the same results are obtained.

We claim:

1. In a process wherein olefinic hydrocarbon is polymerized in an inert reaction medium by means of a catalyst system comprising the combination of (1) a metal halide selected from the group consisting of titanium halides, vanadium halides and vanadium oxyhalides and (2) an aluminum alkyl compound selected from the group consisting of trialkyl aluminum, dialkyl aluminum monohalide, alkyl aluminum dihalide and aluminum sesquihalide, and wherein the reaction product is soluble in the reaction medium, the method of separating catalyst components from the reaction mixture which comprises admixing the reaction mixture with a finely divided agent selected from the group consisting of carbonates, bicarbonates, hydroxides and oxides of alkali metals and alkaline earth metals, the amount of said agent added to the reaction mixture being in excess of the amount of said metal halide on a weight basis, admixing the dispersion with water in amount sufficient to destroy the catalyst but insufficient to solubilize said agent, whereby acidic material formed is neutralized by said agent and solid particles containing said agent and the catalyst residue are obtained, and separating the solid particles from the reaction medium solution.

2. Method according to claim 1 wherein the amount of water is 75-150% by weight based on said agent.

3. Method according to claim 2 wherein said agent is a carbonate.

4. Method according to claim 2 wherein said agent is an oxide.

5. Method according to claim 1 wherein the metal moiety of said agent is an alkali metal.

6. Method according to claim 1 wherein said agent is sodium carbonate.

7. Method according to claim 1 wherein said agent is limestone.

References Cited in the file of this patent
UNITED STATES PATENTS

| | | |
|---|---|---|
| 2,734,892 | Carter | Feb. 14, 1956 |
| 2,951,833 | Young | Sept. 6, 1960 |
| 3,006,907 | Rehn et al. | Oct. 31, 1961 |